US011440133B2

(12) United States Patent
Liu et al.

(10) Patent No.: US 11,440,133 B2
(45) Date of Patent: Sep. 13, 2022

(54) LOW-COST FRICTION STIR PROCESSING TOOL

(71) Applicant: Mazak Corporation, Florence, KY (US)

(72) Inventors: Qingyuan Liu, Orem, UT (US); Russell J. Steel, Salem, UT (US); Rodney Dale Fleck, Draper, UT (US)

(73) Assignee: Mazak Corporation, Florence, KY (US)

( * ) Notice: Subject to any disclaimer, the term of this patent is extended or adjusted under 35 U.S.C. 154(b) by 736 days.

(21) Appl. No.: 16/401,907

(22) Filed: May 2, 2019

(65) Prior Publication Data

US 2019/0337087 A1 Nov. 7, 2019

Related U.S. Application Data

(60) Provisional application No. 62/667,043, filed on May 4, 2018.

(51) Int. Cl.
*B23K 20/00* (2006.01)
*B23K 20/12* (2006.01)
*B22F 7/00* (2006.01)

(52) U.S. Cl.
CPC .......... *B23K 20/1255* (2013.01); *B22F 7/008* (2013.01); *B22F 2301/20* (2013.01); *B22F 2302/20* (2013.01)

(58) Field of Classification Search
CPC .. B23K 20/12; B23K 20/122; B23K 20/1225; B22F 3/15; B22F 1/0003; C22C 27/04
See application file for complete search history.

(56) References Cited

U.S. PATENT DOCUMENTS

| | | |
|---|---|---|
| 6,648,206 B2 | 11/2003 | Nelson |
| 6,732,901 B2 | 5/2004 | Nelson |
| 6,779,704 B2 | 8/2004 | Nelson |
| 7,124,929 B2 | 10/2006 | Nelson |
| 7,152,776 B2 | 12/2006 | Nelson |
| 7,225,968 B2 | 6/2007 | Packer |
| 7,270,257 B2 | 9/2007 | Steel |
| 7,494,040 B2 | 2/2009 | Babb |
| 7,530,486 B2 | 5/2009 | Flak |

(Continued)

FOREIGN PATENT DOCUMENTS

| | | |
|---|---|---|
| EP | 2792759 A1 | 10/2014 |
| EP | 3141625 A1 | 3/2017 |

(Continued)

OTHER PUBLICATIONS

R. Rai et al. "Review: friction stir welding tools," Science and Technology of Welding and Joining, vol. 16, No. 4, published May 1, 2011, (pp. 325-342).

(Continued)

*Primary Examiner* — Erin B Saad (74) *Attorney, Agent, or Firm* — Fitch, Even, Tabin & Flannery LLP (57) ABSTRACT

A friction stir processing (FSP) tool includes a working material. The working material has a matrix phase and a particulate phase. The matrix phase includes tungsten and an alloy material. The particulate phase is located within the matrix phase, and the particulate phase has an indentation hardness less than 45 GPa.

8 Claims, 6 Drawing Sheets

(56) References Cited

U.S. PATENT DOCUMENTS

| | | | |
|---|---|---|---|
| 7,608,296 B2 | 10/2009 | Packer | |
| 7,651,018 B2 | 1/2010 | Packer | |
| 7,661,572 B2 | 2/2010 | Nelson | |
| 7,753,252 B2 | 7/2010 | Taylor | |
| 7,845,545 B2 | 12/2010 | Packer | |
| 7,909,231 B2 | 3/2011 | Babb | |
| 7,992,759 B2 | 8/2011 | Steel | |
| 7,993,575 B2 | 8/2011 | Nelson | |
| 8,056,797 B2 | 11/2011 | Packer | |
| 8,114,474 B1 | 2/2012 | Dudt | |
| 8,157,154 B2 | 4/2012 | Packer | |
| 8,186,561 B2 | 5/2012 | Allen | |
| 8,241,556 B2 | 8/2012 | Rosal | |
| 8,302,834 B2 | 11/2012 | Nelson | |
| 8,317,080 B2 | 11/2012 | Kingston | |
| 8,469,256 B2 | 6/2013 | Babb | |
| 8,490,855 B2 | 7/2013 | Kingston | |
| 8,550,326 B2 | 10/2013 | Packer | |
| 8,910,851 B2 | 12/2014 | Rosal | |
| 8,955,734 B2 | 2/2015 | Steel | |
| 9,061,370 B2 | 6/2015 | Nelson | |
| 9,061,371 B2 | 6/2015 | Higgins | |
| 9,242,308 B2 | 1/2016 | Peterson | |
| 9,334,562 B2* | 5/2016 | Rozak | H01J 37/3429 |
| 9,352,425 B2 | 5/2016 | Rosal | |
| 9,764,375 B2 | 9/2017 | Miles | |
| 9,922,808 B2* | 3/2018 | Rozak | C23C 14/3414 |
| 10,211,035 B2* | 2/2019 | Rozak | B22F 1/0003 |
| 10,465,266 B2* | 11/2019 | Tsuji | B22F 1/00 |
| 10,727,032 B2* | 7/2020 | Rozak | C23C 14/3407 |
| 2003/0075584 A1 | 4/2003 | Sarik | |
| 2005/0006439 A1 | 1/2005 | Packer | |
| 2005/0051602 A1 | 3/2005 | Babb | |
| 2005/0142005 A1 | 6/2005 | Traylor | |
| 2006/0032333 A1 | 2/2006 | Steel | |
| 2006/0032891 A1 | 2/2006 | Flak | |
| 2006/0049234 A1* | 3/2006 | Flak | B23K 20/1225 228/2.1 |
| 2006/0157531 A1 | 7/2006 | Packer | |
| 2006/0175382 A1 | 8/2006 | Packer | |
| 2006/0255094 A1* | 11/2006 | Taylor | B23K 20/1265 228/101 |
| 2007/0057015 A1 | 3/2007 | Colligan | |
| 2007/0119276 A1 | 5/2007 | Liu | |
| 2007/0187465 A1 | 8/2007 | Eyre | |
| 2008/0029578 A1 | 2/2008 | Steel | |
| 2009/0260299 A1* | 10/2009 | Liu | C22C 1/045 51/309 |
| 2009/0294514 A1 | 12/2009 | Babb | |
| 2010/0038407 A1* | 2/2010 | Keshavan | B23K 20/122 228/112.1 |
| 2010/0038408 A1* | 2/2010 | Keshavan | B23K 20/1275 228/112.1 |
| 2010/0071961 A1 | 3/2010 | Steel | |
| 2010/0078224 A1 | 4/2010 | Steel | |
| 2011/0127311 A1 | 6/2011 | Peterson | |
| 2011/0172802 A1 | 7/2011 | Babb | |
| 2012/0055977 A1 | 3/2012 | Steel | |
| 2012/0227546 A1 | 9/2012 | Allen | |
| 2012/0273555 A1 | 11/2012 | Flak | |
| 2012/0285826 A1* | 11/2012 | Rozak | H01J 37/3491 204/298.13 |
| 2013/0062395 A1 | 3/2013 | Nelson | |
| 2013/0206818 A1 | 8/2013 | Higgins | |
| 2013/0228612 A1 | 9/2013 | Higgins | |
| 2013/0264373 A1 | 10/2013 | Miyazaki | |
| 2013/0299561 A1 | 11/2013 | Higgins | |
| 2014/0008418 A1 | 1/2014 | Steel | |
| 2014/0151438 A1 | 6/2014 | Fleck | |
| 2015/0041521 A1 | 2/2015 | Matsushita | |
| 2015/0258628 A1 | 9/2015 | Flak | |
| 2016/0196961 A1* | 7/2016 | Rozak | C22C 27/04 425/78 |
| 2016/0332252 A1 | 11/2016 | Obaditch | |
| 2017/0191148 A1* | 7/2017 | Tsuji | C22C 27/04 |
| 2017/0197274 A1 | 7/2017 | Steel | |
| 2017/0216961 A1 | 8/2017 | Utter | |
| 2018/0099349 A1 | 4/2018 | Packer | |
| 2018/0190476 A1* | 7/2018 | Rozak | C23C 14/3414 |
| 2019/0061046 A1 | 2/2019 | Fleck | |
| 2019/0061048 A1 | 2/2019 | Fleck | |
| 2019/0151982 A1 | 5/2019 | Rosal | |
| 2019/0214237 A1* | 7/2019 | Rozak | B22F 3/24 |
| 2020/0381225 A1* | 12/2020 | Rozak | C22C 27/04 |

FOREIGN PATENT DOCUMENTS

| | | |
|---|---|---|
| JP | 2003326372 | 11/2003 |
| JP | 2011140060 | 7/2011 |
| WO | 0185385 | 11/2001 |
| WO | 2017070725 | 5/2017 |

OTHER PUBLICATIONS

Extended European Search Report issued in corresponding European Patent Application No. 19796432.3, dated Jun. 4, 2021, 9 pages.

Mohan and Wu, A Review on Friction Stir Welding of Steels, Chinese Journal of Mechanical Engineering, (2021) 34:137, 2 FSW Tools for Joining Steels. Accessed on Mar. 15, 2022 at the following link: https://cjme.springeropen.com/articles/10.1186/s10033-021-00655-3#ref-CR20.

Cadem, Diamond tools (PCD tools)—why they cannot cut steel, May 26, 2016, available at https://cadem.com/why-diamond-tools-cannot-cut-steel/.

Reiter, Brier, and Bleicher, Machining of Iron-Carbon Alloys by the Use of Poly-Crystalline Diamond Cutting Inserts with Internal Cooling, Journal of Manufacturing and Materials Processing, 2018, 5, 57, Introduction, published Aug. 31, 2018, available at https://www.mdpi.eom/2504-4494/2/3/57/pdf.

U.S. Appl. No. 11/821,790, filed Jun. 25, 2007, Scott M Packer.
U.S. Appl. No. 12/392,030, filed Feb. 24, 2009, Jonathan A Babb.
U.S. Appl. No. 16/407,353, filed May 9, 2019, Michael P Miles.
International Search Report and Writtten Opinion issued in corresponding International Application No. PCT/US/2019/030533, dated Jul. 15, 2019, 10 pages.
U.S. Appl. No. 60/573,703, filed May 24, 2014, 6 pages.

\* cited by examiner

LOW-COST FRICTION STIR PROCESSING TOOL

CROSS-REFERENCE TO RELATED APPLICATIONS

This application claims the benefit of U.S. Provisional Application No. 62/667,043, filed May 4, 2018.

BACKGROUND

Friction stir processing ("FSP") of metals has been used to attach weldable materials to one another in a solid state joining process. FSP uses the motion of a pin pressed against the surface of a weldable material to generate heat and friction to move the weldable material. The material can plasticize and physically stir together with a second material to which the first material is joined. A pin, a pin and shoulder, or another "FSP tool" may be rotated in contact with a workpiece. A force is applied to the FSP tip to urge the FSP tool against the workpiece. The FSP tool is moved along the workpiece to stir the material of the workpiece. The physical process of mixing material from two plates joins the plates.

FSP joins weldable materials in a solid-state process that avoids many of the potential defects of other welding processes. For example, FSP produces a stirred region along the path of the tool that is generally indistinguishable from the original material. FSP may be performed without the inclusion of an additional material or use of shield gasses. Some welding methods, such as metal-inert gas ("MIG") welding, may introduce an additional material to create a bond. Other welding methods, such as tungsten-inert gas ("TIG") welding, may use a non-consumable contact point to heat one or more workpieces. However, the heating may cause the one or more workpieces to attain a liquid phase and risk a phase change in the one or more workpieces. A phase change may compromise the integrity of the bond and, potentially, the workpiece, itself. To limit the possibility of a phase change or other reaction, TIG welding and similar processes utilize an inert gas "shield" around the contact area.

FSP may, therefore, provide more controllable bonds in various applications. The predictability of FSP may be desirable during the manufacturing and/or assembly of structures or devices that experience high forces during use in environments or applications in which the structure or device may be inaccessible by operators. The elevated temperatures involved with FSP, however, may allow the reaction of the FSP tool and the workpiece material. For example, cubic boron nitride may react with titanium workpieces to form titanium nitride phases at the FSP zone, consuming the FSP tool in the process. In another example, diamond may react with ferrous workpieces to form iron carbide phase and consume the diamond FSP tool. As cubic boron nitride, diamond, and other ultrahard materials are reactive at elevated temperatures, other materials may be beneficial for FSP at high temperatures.

SUMMARY

In some embodiments, a friction stir processing (FSP) tool includes a working material. The working material has a matrix phase and a particulate phase. The matrix phase includes tungsten and an alloy material. The particulate phase is located within the matrix phase, and the particulate phase has an indentation hardness less than 45 Gigapascals (GPa).

In other embodiments, a FSP tool includes a working material. The working material has a matrix phase and a particulate phase. The matrix phase includes a tungsten-rhenium alloy. The particulate phase is located within the matrix phase, and the particulate phase has an indentation hardness less than 45 GPa.

In some embodiments, a method of manufacturing a FSP tool includes mixing a particulate precursor with a tungsten precursor and an alloy precursor to form a mixture and sintering the mixture at a sintering temperature greater than 1000° C. and a high pressure greater than 2.0 GPa. The particulate precursor includes particles having an indentation hardness less than 45 GPa. The method further includes alloying the tungsten precursor and alloy precursor to form a matrix phase including a tungsten alloy and embedding the particulate precursor as a particulate phase in the matrix phase.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, non-schematic drawings should be considered as being to scale for some embodiments of the present disclosure. Understanding that the drawings depict some example embodiments, the embodiments will be described and explained with additional specificity and detail through the use of the accompanying drawings in which:

FIG. 2-1 is a side cross-sectional view of a multi-piece FSP tool, according to some embodiments of the present disclosure;

FIG. 2-2 is a side cross-sectional view of a monolithic FSP tool, according to some embodiments of the present disclosure;

FIG. 6-1 is a schematic representation of a microstructure of a working material precursor, according to some embodiments of the present disclosure;

FIG. 6-2 is a schematic representation of a microstructure of another working material precursor, according to some embodiments of the present disclosure;

DETAILED DESCRIPTION

This disclosure generally relates to devices, systems, and methods for increasing the wear resistance of a friction stir processing (FSP) tool for friction stir welding, joining, processing, or other friction stirring procedures. More specifically, embodiments of this disclosure relate to the design, manufacture, and use of low-cost FSP tools that may friction stir process a workpiece including ferrous and/or titanium-bearing metals and metal alloys without reaction to the workpiece.

In some embodiments, a FSP tool according to the present disclosure includes a working surface that includes a working material of embedded particles in a tungsten alloy matrix. The working surface of the FSP tool may include at least a portion of a shoulder and/or a pin of the FSP tool. The working material may include a tungsten alloy matrix that supports a plurality of particles with an indentation hardness greater than that of the tungsten matrix and with a hardness less than 45 GPa. Such materials may be sufficiently hard to allow the FSP of high melting temperature metals and alloys without reacting with the alloys. For example, materials with an indentation hardness greater than 45 GPa, including cubic boron nitride and polycrystalline diamond may react with many common high melting temperature alloys, such as titanium alloys and ferrous alloys, while having a cost above embodiments of FSP tools described herein.

Figure 1:
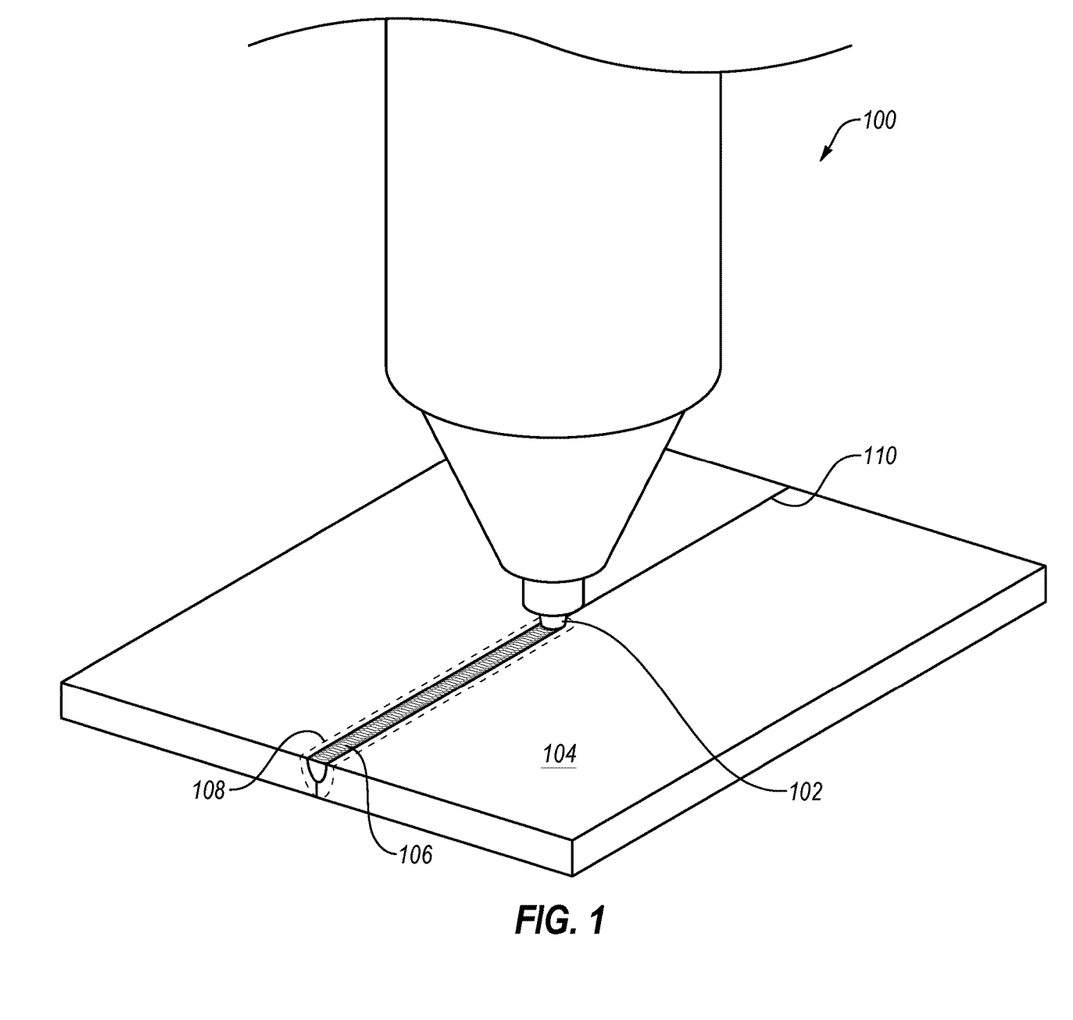
FIG. 1 is a perspective view of a friction stir processing (FSP) system, according to some embodiments of the present disclosure.

FIG. 1 illustrates an embodiment of a FSP system 100 with a FSP tool 102 in contact with a first workpiece 104-1 and a second workpiece 104-2. Rotation of the FSP tool 102 in contact with the workpieces 104-1, 104-2 may be used to friction stir the workpieces 104-1, 104-2 in a stirred zone 106 and create a heat affected zone 108 beyond the stirred zone 106.

In some embodiments, FSP includes friction stir welding a first workpiece to a second workpiece. For example, the first workpiece 104-1 may be positioned contacting the second workpiece 104-2 in a butt joint 110, and the first workpiece 104-1 and second workpiece 104-2 may be joined along the butt joint 110 by FSP. The FSP tool 102 may flow first workpiece material and second workpiece material in a circular path and perpendicular to the butt joint 110 in the stirred zone 106 to transfer material between the first workpiece 104-1 and second workpiece 104-2, mechanically joining the first workpiece 104-1 and second workpiece 104-2 along the butt joint 110.

Stir welding is a solid state joining process that plastically moves material of the first workpiece 104-1 and second workpiece 104-2 to interlock the first workpiece 104-1 and second workpiece 104-2 at a microstructural level. In some embodiments, the first workpiece 104-1 and second workpiece 104-2 are the same material. For example, the first workpiece 104-1 and the second workpiece 104-2 may be both a ferrous alloy. In other embodiments, the first workpiece 104-1 and second workpiece 104-2 are different materials. For example, the first workpiece 104-1 may be a ferrous alloy, and the second workpiece 104-2 may be a titanium alloy.

In other embodiments, FSP includes the stirring of a workpiece 104-1, 104-2 to refine the grain structure in the stirred zone 106 and/or the heat affected zone 108 of the workpiece material. For example, the crystalline structure of the workpiece material may be at least partially dependent on the manufacturing of the workpiece. The as-manufactured grain structure may be undesirable for a finished part.

In some examples, a cast workpiece has a random orientation (i.e., little or no texture) with a relatively large grain size with little to no deformation within each grain. FSP of the cast aluminum may refine the grain size to produce a smaller average grain size (increasing the boundary density of the microstructure). FSP of the cast aluminum may further produce internal strain within the grains. Increases in one or both of the grain boundary density and the internal strain may increase the hardness of the aluminum.

In other examples, an extruded or rolled workpiece exhibits an orientation to the grain structure (e.g., a <101> texture or a <001> texture, respectively in aluminum) that is undesirable in the finished part. For example, an extruded texture in an aluminum rod may increase the mechanical wear rate of the aluminum when used as an axle. FSP of the aluminum may mechanically alter the grain structure of the aluminum rod and/or remove the extruded texture of the rod surface. Orientation textures may affect other mechanical or chemical properties of the workpiece, such as anisotropic hardness or toughness, or oxidation rates.

In yet another embodiment, stir welding by FSP includes friction stirring of a first workpiece and a second workpiece adjacent one another in a lap joint with the first workpiece 104-1 overlapping a surface of the second workpiece 104-2. The FSP tool 102 may be positioned to contact a surface of the first workpiece 104-1 and the FSP tool 102 may be plunged into the first workpiece 104-1 and, optionally, the second workpiece 104-2 to plastically move first workpiece material and second workpiece material to interlock the first workpiece 104-1 and the second workpiece 104-2 at the lap joint.

Figure 21:
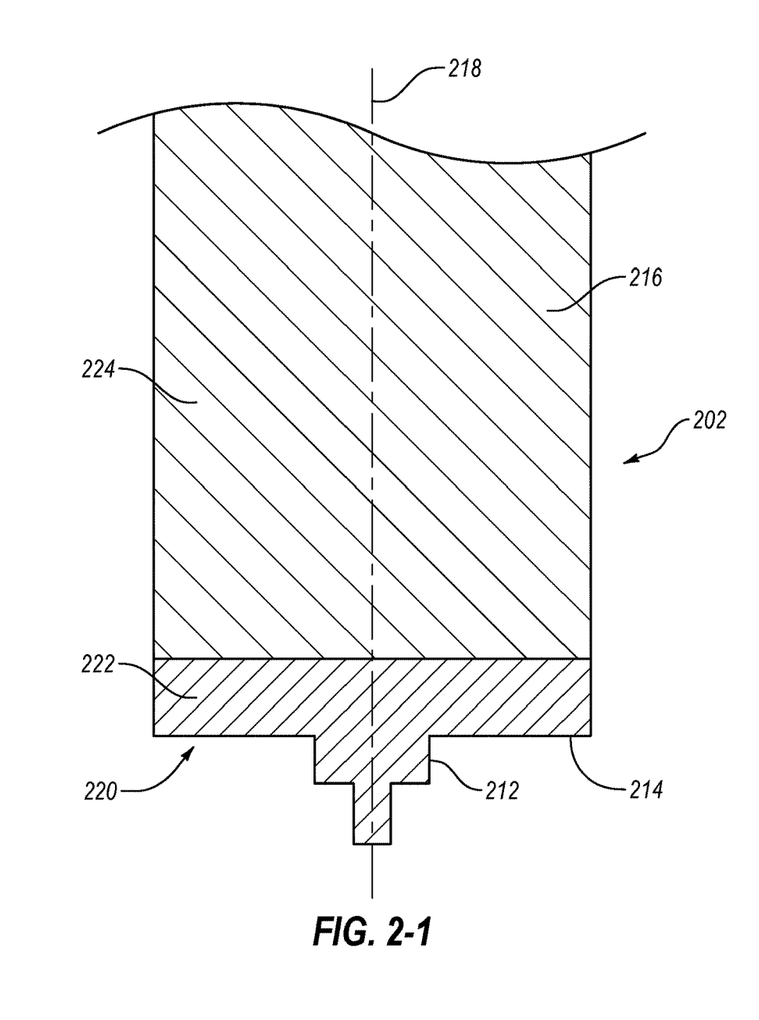
Figure 22:
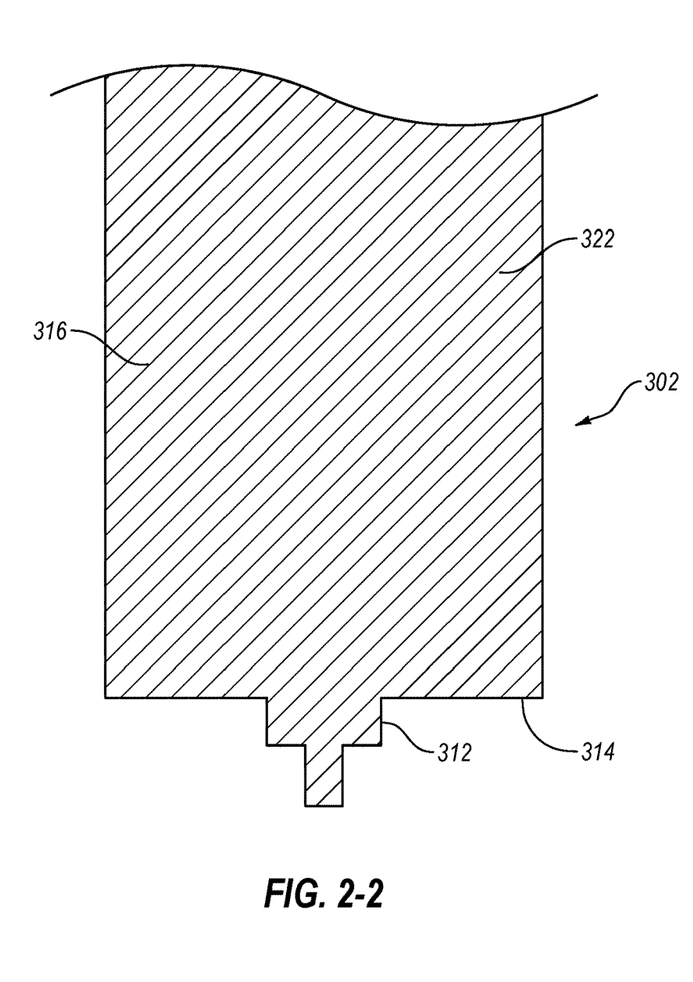

FIG. 2-1 is a side cross-sectional view of an embodiment of a FSP tool 202, according to the present disclosure. In some embodiments, the FSP tool 202 has a single-body construction. In other embodiments, the FSP tool 202 has a multi-piece construction. The FSP tool 202 of FIG. 2-1 has a pin 212, a shoulder 214, and a shank 216, with each being integrally formed with one another. For example, the FSP tool 202 may be formed in a HPHT press in a single press cycle to form the entire pin 212, shoulder 214, and a portion of the shank 216 (see FIG. 2-1) or a full portion of the shank (see FIG. 2-2). In some examples, the FSP tool 202 may be formed in a press at temperature greater than 1,000° C. and pressures greater than 2.0 GPa.

In some embodiments, a portion of the FSP tool 202 that is oriented to face longitudinally downwardly in the orientation shown in FIG. 2-1, is the working surface 220 of the FSP tool 202. The working surface 220 includes a working material 222. In the same or other embodiments, the pin 212, shoulder 214, and at least a portion of the shank 216 include or are formed of the same working material 222. For example, the pin 212, shoulder 214, and a portion of the shank 216 nearest the shoulder 214 in the FSP tool 202 of FIG. 2-1 are integrally formed from the working material 222 with a second material 224 of another portion of the shank 216 coupled (e.g., mechanically fastened, brazed, welded, bonded, etc.) of integrally formed with, or otherwise connected to the working material 222. In at least one example, the second material 224 includes a carbide material, such as tungsten carbide, titanium carbide, or tantalum carbide. In at least one other example, the second material 224 is a dual phase material with a metal matrix to provide additional toughness to the shank 216.

FIG. 2-2 is a cross-sectional view of an embodiment of a single body FSP tool 302 with a monolithic construction. In other embodiments, the FSP tool is formed entirely of the working material 322. For example, the FSP tool 302 includes a pin 312, a shoulder 314, and a shank 316 formed from or formed of a single monolithic piece of working material 322. A monolithic construction may be substantially uniform through the FSP tool 302. In other embodiments, the FSP tool 302 has a continuous or step-wise gradient composition of the working material 322.

Figure 3:
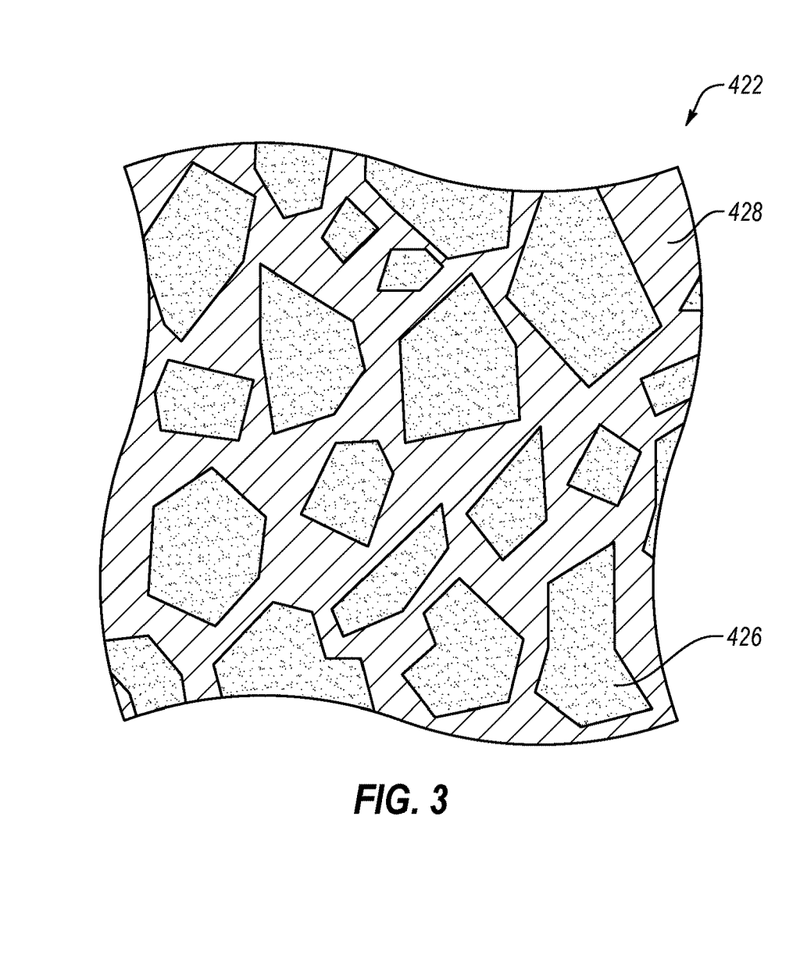
FIG. 3 is a schematic representation of a microstructure of a working material, according to some embodiments of the present disclosure.

FIG. 3 is a detail view of a cross-section of an embodiment of working material 422. The working material 422 has a composition including a particulate phase 426 and a matrix phase 428. In some embodiments, the particulate phase 426 forms a percentage of the total volume of the working material 422 in a range having an upper value, a lower value, or upper and lower values including any of 50%, 55%, 60%, 65%, 70%, 75%, 80%, 85%, 90%, 95%, 99%, or any values therebetween. For example, the particulate phase 426 may be greater than 50% of the total volume of the working material 422. In other examples, the particulate phase 426 is less than 99% of the total volume of the working material 422. In yet other examples, the particulate phase 426 is between 50% and 99% of the total volume of the working material 422. In further examples, the particulate phase 426 is between 60% and 90% of the total volume of the working material 422.

In some embodiments, the matrix phase 428 is the balance of the total volume of the working material 422. For example, the working material 422 may be a dual phase material with no porosity, and the particulate phase 426 and the matrix phase 428 may be the sole constituent parts of the working material 422. In other embodiments, the working material 422 includes at least some porosity. For example, the working material 422 may have a porosity less than 5%. In other examples, the working material 422 has a porosity less than 3%. In yet other examples, the working material 422 has a porosity less than 1%. In at least one example, the working material 422 has effectively no porosity.

In other embodiments, the matrix phase 428 and one or more tertiary phases are the balance of the total volume. For example, the working material 422 may include a precipitate phase or a residual phase from a sintering aid. In at least one example, a precipitate phase includes an oxide phase. In another example, a precipitate phase includes a carbide phase. In some examples, a residual phase includes an aluminum bearing phase. In at least one example, the working material 422 includes an aluminum oxide ($Al_2O_3$) phase formed during oxidation of an aluminum sintering aid.

In some embodiments, the particulate phase 426 includes one or more of a variety of materials with an indentation hardness (IH) value below 45 GPa and greater than the indentation hardness of the matrix phase 426. For example, the particulate phase 426 may include titanium nitride (IH=20 GPa), titanium carbon nitride (IH=42 GPa), osmium diboride (IH=37 GPa), tungsten boride=30 GPa), other hard materials with indentation hardnesses below 45 GPa, or combinations thereof. For example, the particulate phase 426 may be partially titanium nitride and partially titanium carbon nitride. In other examples, the particulate phase 426 is partially titanium nitride, partially titanium carbon nitride, and partially tungsten boride. In at least one example, the particulate phase 426 is entirely titanium nitride, entirely titanium carbon nitride, or entirely tungsten boride In some embodiments, the matrix phase 428 is a tungsten alloy. The tungsten alloy may have a tungsten weight percentage (wt %) in a range having an upper value, a lower value, or upper and lower values including any of 50 wt %, 55 wt %, 60 wt %, 65 wt %, 70 wt %, 75 wt %, 80 wt %, 85 wt %, 90 wt %, 95 wt %, 99 wt %, or any values therebetween. For example, the matrix phase 428 may be greater than 50 wt % tungsten. In other examples, the matrix phase 428 is less than 99 wt % tungsten. In yet other examples, the matrix phase 428 is between 50 wt % and 99 wt % tungsten. In further examples, the matrix phase 428 is between 60 wt % and 90 wt % tungsten. In at least one example, the matrix phase 428 is at least 75 wt % tungsten.

In some embodiments, the matrix phase 428 includes a tungsten rhenium alloy. In one example, the matrix phase 428 is 50 wt % tungsten and 50 wt % rhenium. In other examples, the matrix phase 428 is 75 wt % tungsten and 25 wt % rhenium. In yet other examples, the matrix phase 428 is 90 wt % tungsten and 10 wt % rhenium. In other embodiments, the matrix phase 428 is a tungsten lanthanide alloy. For example, the matrix phase 428 may be 99 wt % tungsten and 1 wt % lanthanum.

Figure 4:
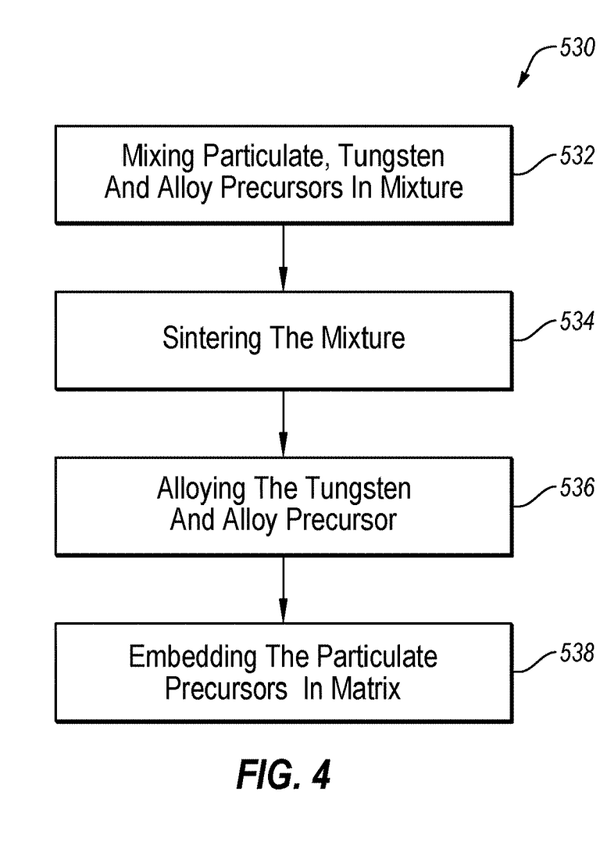
FIG. 4 is a flowchart illustrating a method of manufacturing an FSP tool, according to some embodiments of the present disclosure.

FIG. 4 is a flowchart illustrating an embodiment of a method 530 of manufacturing a FSP tool according to the present disclosure. In some embodiments, the method 530 includes mixing a particulate precursor, a tungsten precursor, and an alloy precursor into a mixture at 532. In some embodiments, the alloy material includes rhenium. In the same or other embodiments, the alloy material includes lanthanum. The method 530 optionally includes sintering the mixture at high pressure and high temperature at 534.

In some embodiments, the tungsten precursor and alloy precursor are provided in powder form and are combined to form the mixture prior to sintering. In other embodiments, the tungsten and alloy precursors are bonded to one another before sintering with the particulate precursor. The relative percentages of tungsten precursor and alloy precursor in the mixture can vary depending on the desired material properties. In some embodiments, the compound includes 25% or lower alloy precursor and 75% or higher tungsten precursor by volume.

In some embodiments, the method 530 further includes alloying the tungsten precursor and the alloy precursor together at the high pressure and high temperature conditions at 536. Alloying the tungsten precursor and the alloy precursor together at the high pressure and high temperature conditions may create a unique matrix material with lower porosity and higher hardness than a tungsten alloy sintered at lower temperature and pressure, even with the same elemental composition. Upon alloying of the tungsten and alloy precursors together to form the matrix phase, the particulate precursor may be embedded in the matrix as the particulate phase at 538. In some embodiments, the particulate phase is mechanically held in place by the surrounding or partially surrounding matrix phase. In other embodiments, the particulate phase and matrix phase at least partially form a microstructural bond that includes a plurality of chemical bonds between the matrix phase and the particulate phase.

Figure 5:
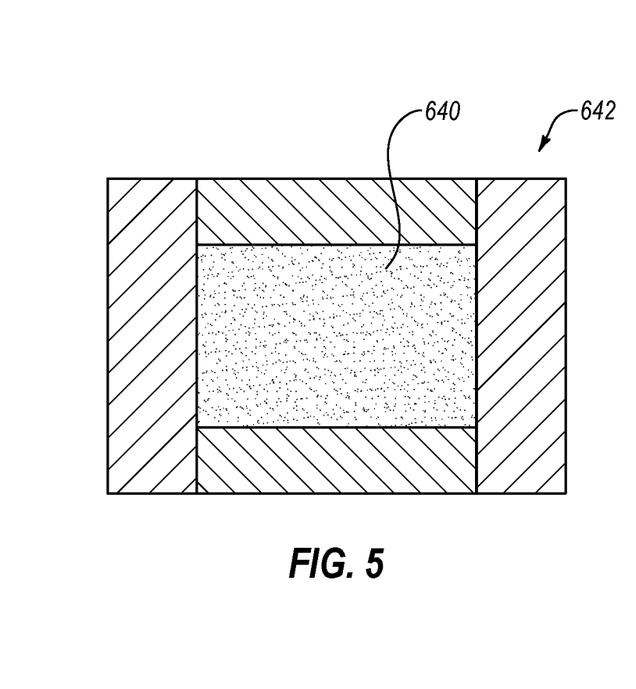
FIG. 5 is a side cross-sectional view of a working material precursor in a can, according to some embodiments of the present disclosure.

FIG. 5 through FIG. 8 illustrate embodiments according to the method described herein. FIG. 5 is a schematic, side cross-sectional view of an embodiment of a mixture 640 in an enclosure, known as a "can" 642. The can 642 with the mixture 640 may be placed in a press and subjected to high pressure and high temperature conditions. The can 642 is optionally formed from niobium or molybdenum and transfers the heat and pressure from the press to the mixture 640 contained in the can 642. The elevated pressure and temperature conditions are maintained for a time sufficient to sinter the materials (and may include cycles of varying temperature and/or pressure). After the sintering process, the enclosure and its contents are cooled and the pressure reduced to ambient conditions.

Figure 61:
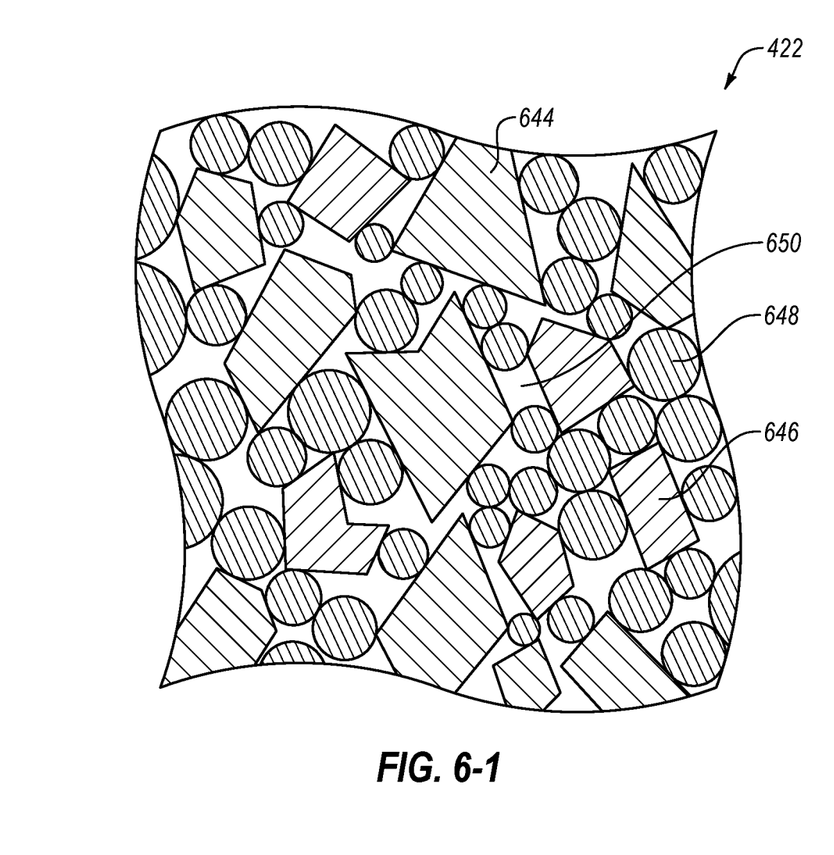

FIG. 6-1 is a detail view of an embodiment of the mixture 640. The mixture 640 includes a particulate precursor 644, a tungsten precursor 646, and an alloy precursor 648 in any ratio by volume described herein. In at least one example, the mixture 640 is 50% particulate precursor 644, 37.5% tungsten precursor 646, and 12.5% alloy precursor 648 by volume, excluding the void space 650 in the mixture 640. In some embodiments, the void space 650 is related to the porosity of the working material. The HPHT conditions of the sintering process may remove some or substantially all void space 650 from the mixture 640 and/or porosity from the working material.

In some embodiments, the volume of each precursor material is measured before the particulate precursor 644, tungsten precursor 646, and alloy precursor 648 are homogenously combined to form the mixture 640. In other embodiments, the tungsten precursor 646 and alloy precursor 648 are bonded before mixing with the particulate precursor 644.

Figure 62:
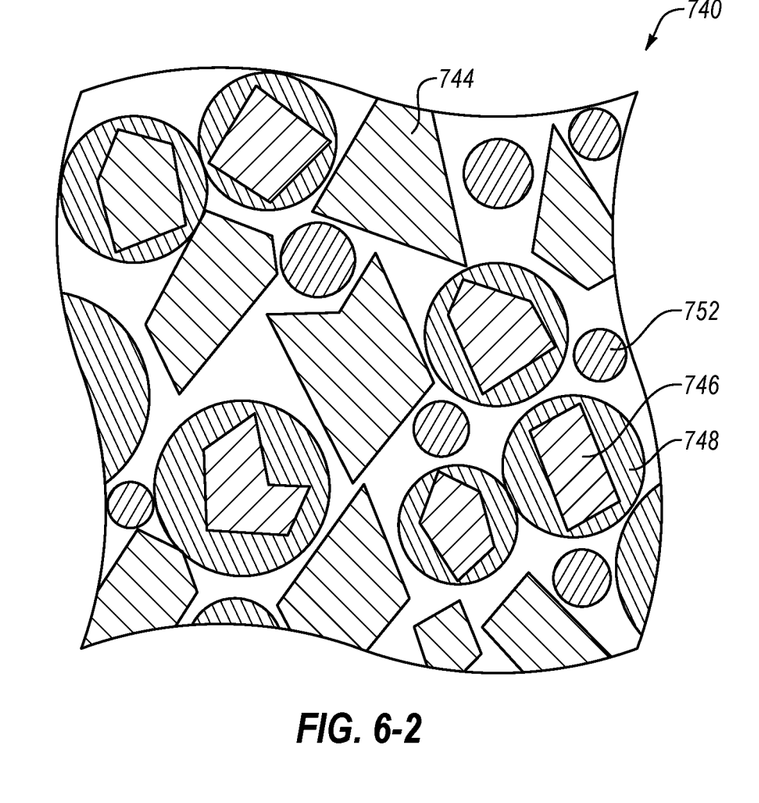

FIG. 6-2 is a detail view of an example embodiment of a mixture 740 with the tungsten precursor 746 and alloy precursor 748 bonded before mixing with the particulate precursor 744. The tungsten precursor 746 may be coated with or attached to the alloy precursor 748 to create a powder of combined matrix precursor material including both the tungsten precursor 746 and alloy precursor 748. For example, a rhenium coating may be applied to tungsten powder to form the matrix precursor that, when sintered at HPHT conditions, forms the matrix material 740. In other embodiments, the tungsten precursor 746 coats the alloy precursor 748.

In some embodiments, the mixture 740 includes a sintering aid 752. For example, an additional constituent may be added to the mixture 740 to promote sintering and promote bonding of the matrix phase, the particulate phase, or the matrix phase and particulate phase. In yet other embodiments, the sintering aid 752 reduces or prevents the formation of oxides or carbides with the materials in the particulate phase and/or matrix phase. For example, the sintering aid 752 may include a material, such as aluminum, that favorably oxidizes in the presence of oxygen in the atmosphere, consuming the oxygen and limiting formation of oxides of the materials of the particulate phase and/or matrix phase.

Figure 7:
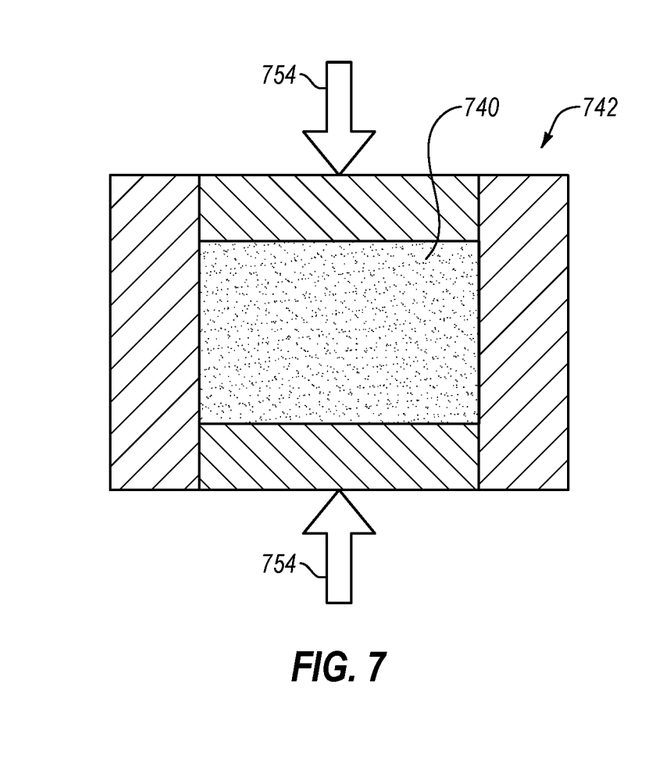
FIG. 7 is a side cross-sectional view of applying a compressive force to a working material precursor in a can, according to some embodiments of the present disclosure.

FIG. 7 schematically illustrates an embodiment of the mixture 740 in a can 742 under HPHT conditions. In HPHT sintering, the sintering process is conducted at elevated pressure 754 and temperature. In some embodiments, the temperature is greater than 1,000° C., and the pressure 754 is greater than 2.0 GPa. In some embodiments, the mixture 740 is heated to a sintering temperature in a range having an upper value, a lower value, or upper and lower values including any of 1,000° C., 1,500° C., 2,000° C., 2,300° C., or any values there between. For example, the sintering temperature may be greater than 1,000° C. In other examples, the sintering temperature is less than 2,300° C. In yet other examples, the sintering temperature is between 1,000° C. and 2,300° C. In further examples, the sintering temperature is between 1,200° C. and 2,200° C. In at least one example, the sintering temperature is greater than 1,500° C.

In some embodiments, the pressure 754 is in a range having an upper value, a lower value, or upper and lower values including any of 2.0 GPa, 3.5 GPa, 5.0 GPa, 6.5 GPa, or any values therebetween. For example, the pressure 754 may be greater than 2.0 GPa. In other examples, the pressure 754 is less than 6.5 GPa. In yet other examples, the pressure 754 is between 2.0 GPa and 6.5 GPa. In further examples, the pressure 754 is between 2.5 GPa and 6.0 GPa. In at least one example, the pressure 754 is greater than 3.0 GPa. Sintering at the HPHT conditions may remove some or substantially all of the void space of the mixture and create the microstructure of the working material including the matrix phase and particulate phase with little to no porosity.

Figure 8:
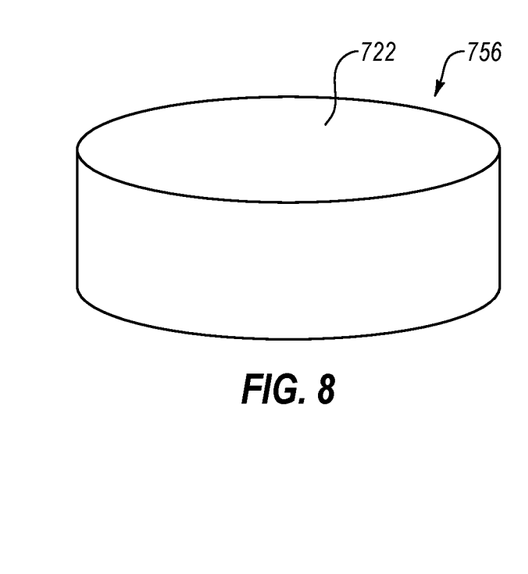
FIG. 8 is a perspective view of a working material blank, according to some embodiments of the present disclosure.

Some embodiments of the method described herein produce a blank, such as illustrated in FIG. 8. In some embodiments, the blank 756 includes working material 722 and is substantially cylindrical. The blank 756, also known as a puck, is then machined to the final dimensions of a FSP tool or a portion of a FSP tool, such as the FSP tools described in relation to FIGS. 2-1 and 2-2.

In some embodiments, a FSP tool according to the present disclosure reduces manufacturing costs and/or manufacturing time compared to other FSP tools, while increasing operational lifetime of the FSP tool. A FSP tool including a working material according to the present disclosure may be capable of friction stir welding, joining, or processing workpieces including ferrous alloys, titanium alloys, other alloys that would otherwise react with diamond tools, cBN tools, or combinations thereof. In at least one embodiment, a FSP tool with titanium nitride particles embedded in a tungsten-rhenium alloy matrix friction stir welds, joins, or processes workpieces that would consume a similarly constructed tool with a PCD working surface or cBN working surface.

One or more specific embodiments of the present disclosure are described herein. These described embodiments are examples of the presently disclosed techniques. Additionally, in an effort to provide a concise description of these embodiments, not all features of an actual embodiment may be described in the specification.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive. Numbers, percentages, ratios, or other values stated herein are intended to include that value, and also other values that are "about" or "approximately" the stated value, as would be appreciated by one of ordinary skill in the art encompassed by embodiments of the present disclosure.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" refer to an amount that is within standard manufacturing or other tolerances, and may also include amounts less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. The described embodiments are therefore to be considered as illustrative and not restrictive, and the scope of the disclosure is indicated by the appended claims rather than by the foregoing description.

What is claimed is:

1. A method of manufacturing a FSP tool, the method comprising:

mixing a particulate precursor with a tungsten precursor and an alloy precursor to form a mixture, the particulate precursor including particles having an indentation hardness less than 45 GPa;

sintering the mixture at a sintering temperature greater than 1000° C. while compressing the mixture with a pressure greater than 2.0 GPa;

alloying the tungsten precursor and alloy precursor to form a matrix phase including a tungsten alloy; and embedding the particulate precursor as a particulate phase in the matrix phase.

2. The method of claim 1, further comprising adding a sintering aid to the mixture.

3. The method of claim 2, the sintering aid including aluminum.

4. The method of claim 1, wherein sintering the mixture includes creating chemical bonds between at least a portion of the particulate precursor and at least a portion of the matrix phase.

5. The method of claim 1, wherein mixing the tungsten precursor with the alloy precursor includes coating the tungsten precursor with the alloy precursor.

6. The method of claim 1, the alloy precursor including rhenium.

7. The method of claim 1, the particulate precursor including titanium nitride.

8. The method of claim 1 wherein sintering the mixture comprises sintering the mixture in a high-pressure high temperature press in a single press cycle.

* * * * *